Oct. 23, 1923. 1,471,973

E. E. MINDER

HOOK

Filed April 18, 1922

Emil E. Minder
INVENTOR

BY Victor J. Evans
ATTORNEY

WITNESS:

Patented Oct. 23, 1923.

1,471,973

UNITED STATES PATENT OFFICE.

EMIL E. MINDER, OF WISDOM, MONTANA.

HOOK.

Application filed April 18, 1922. Serial No. 554,369.

*To all whom it may concern:*

Be it known that I, EMIL E. MINDER, a citizen of the United States, residing at Wisdom, in the county of Beaverhead and State of Montana, have invented new and useful Improvements in Hooks, of which the following is a specification.

This invention relates to a hook, the principal object of the invention being to provide means whereby the hook will securely hold the object to which it is attached, the hook comprising two portions which are pivotally secured together, the two parts forming a closed hook when they are in engagement with each other.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
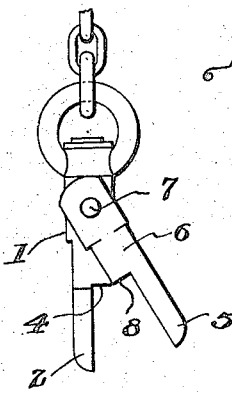
Figure 1 is a view of the hook showing the same in open position.
Figure 2:
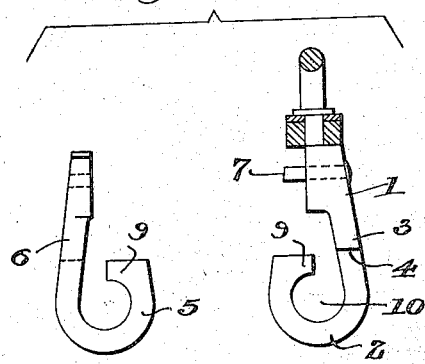
Figures 2 and 3 are detail views.
Figure 3:
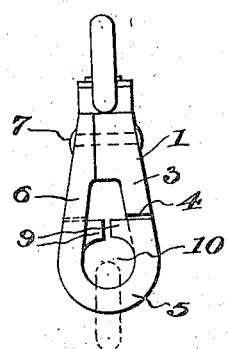

As shown in these views the device includes a head 1 to which the first hook part 2 is connected by its stem 3. A shoulder 4 is formed at the outer end of the stem upon the flat side of the hook part. The hook part 5 has its stem 6 of greater length than the stem 3 so that the stem will engage the head 1 and this stem is pivoted to the head by the pin 7. A shoulder 8 is formed on the stem 6 and the ends of the hook parts will engage the shoulders 4 and 8 when the device is closed. The end of each hook part is provided with an inwardly extending lip 9, which, when the device is closed, form with the rest of the hook parts a circular space 10 for receiving the ring or other object to be held. It will be seen that one hook part will move bodily away from the other part so as to permit the object to be placed in the two hook parts and when the two hook parts are placed together a closed hook will be formed which will be held in closed position by the object being held and thus render it impossible for the device to accidentally release the object.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a pair of hook parts, a stem connected with each hook part, a head connected with the stem of one part, an extension on the stem of the other part, a pin pivoting the extension to the head, shoulders on the stems for engaging the ends of the hook parts and an inwardly extending lip at the end of each hook part, said lips forming with the rest of the hook parts a circular space when the device is in closed position.

In testimony whereof I affix my signature.

EMIL E. MINDER.